Feb. 27, 1940.   R. C. HOWELL   2,191,961
STEERING MECHANISM FOR MOTOR VEHICLES
Filed Aug. 3, 1938   2 Sheets-Sheet 2
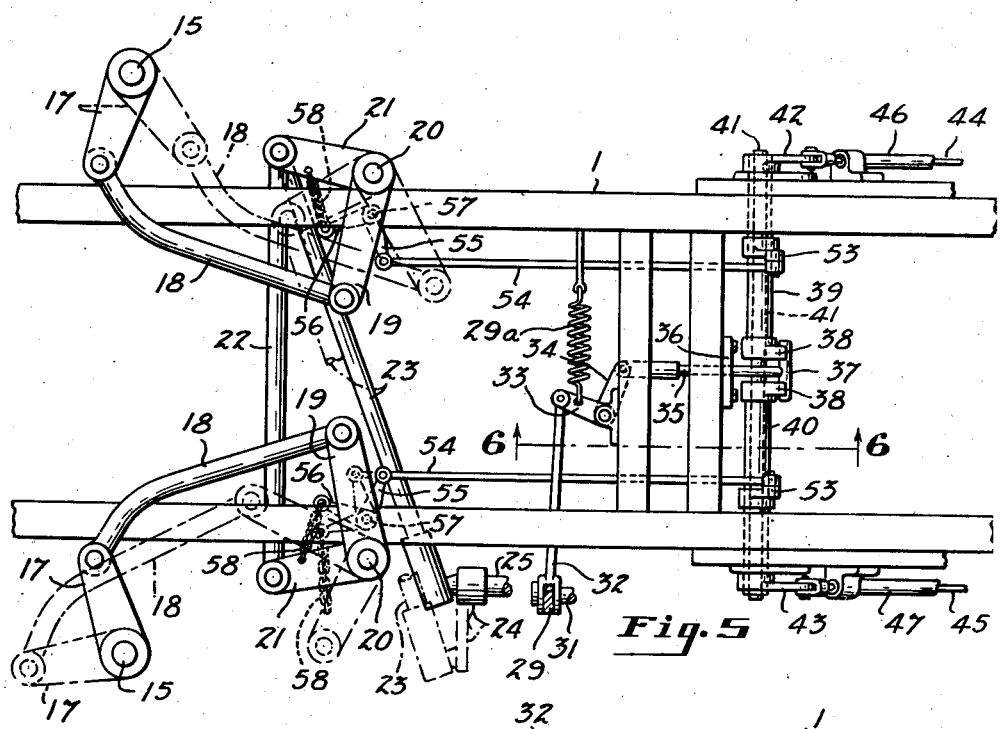
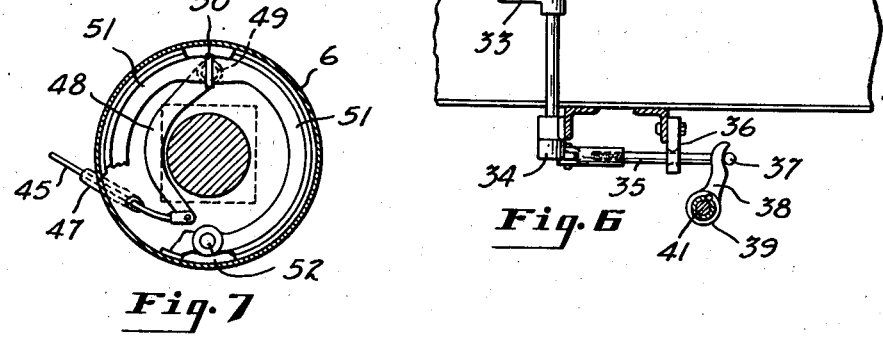
INVENTOR
ROY C. HOWELL
BY Frank S. Greene
ATTORNEY Patented Feb. 27, 1940

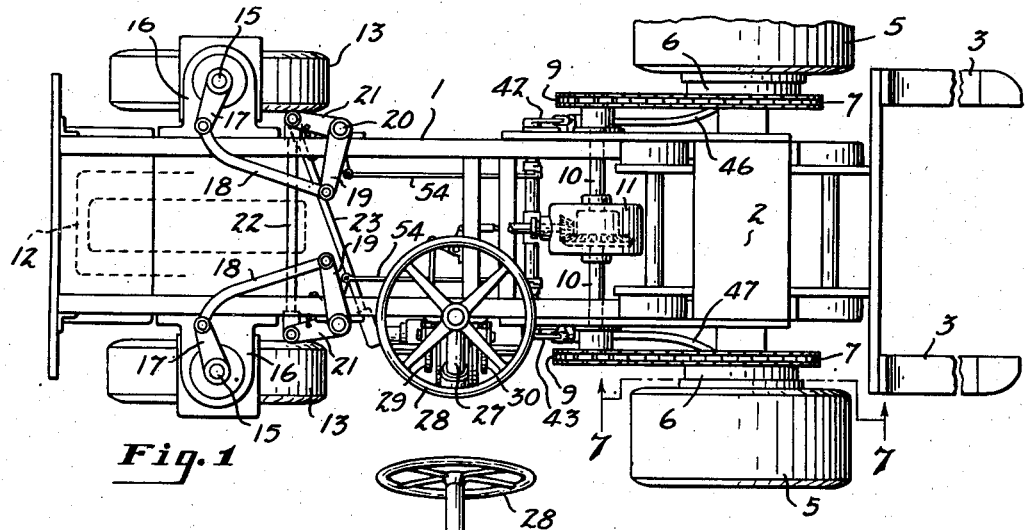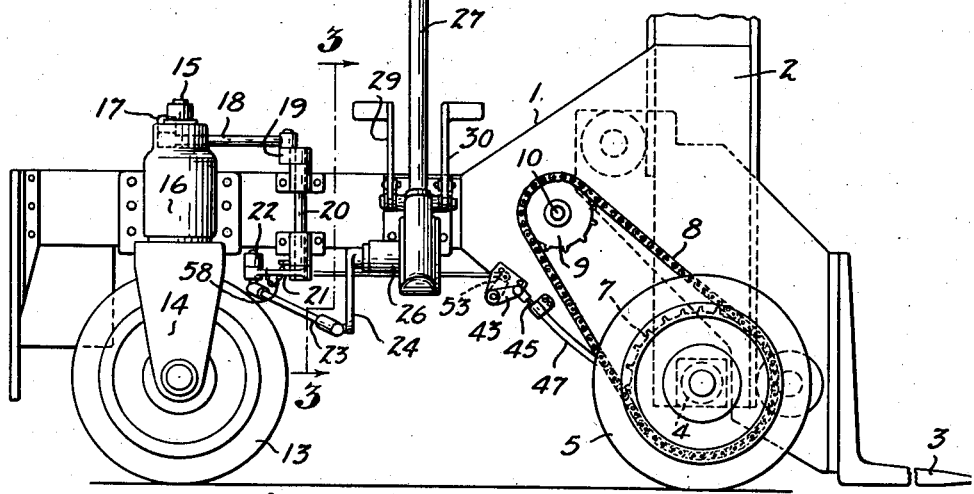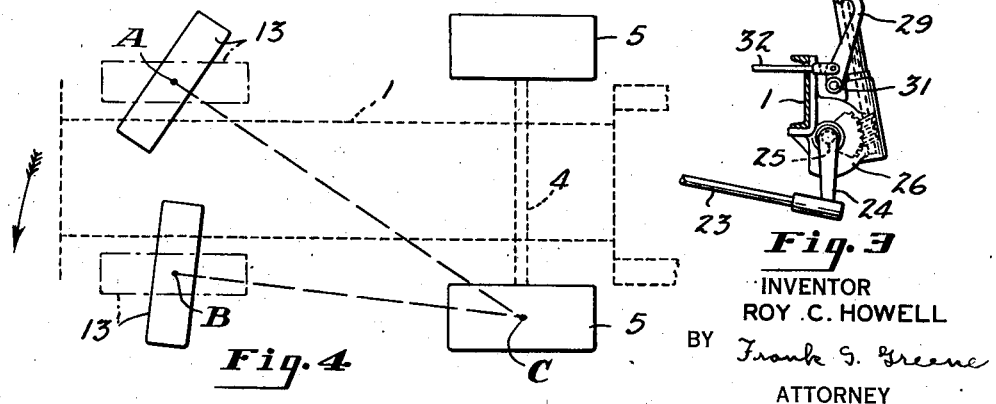

2,191,961

UNITED STATES PATENT OFFICE 2,191,961

STEERING MECHANISM FOR MOTOR VEHICLES

Roy C. Howell, Lakewood, Ohio

Application August 3, 1938, Serial No. 222,856

3 Claims. (Cl. 280—95)

This invention relates to motor vehicles and more particularly to the steering of motor vehicles of the industrial truck type.

Industrial trucks employed for transporting materials in warehouses or storage yards and for loading cars or boats are commonly geared for driving at various speeds, either forward or backward. While the truck can move into or out of narrow passages without turning, it is, however, often difficult to steer such trucks into and out of narrow lateral passages.

The present invention has for its object to provide a motor vehicle which is capable of making very short turns, such as right angle turns from one narrow passage into another.

A further object is to provide a steering gear by which the steering wheels may be swung through the larger angles necessary for making short turns and by which a differential movement is imparted to the steering wheels, such that the wheels travel in concentric paths in making turns and the wheels roll without lateral slip in turning.

A further object is to so interconnect the steering mechanism and vehicle brake mechanism that as the center of turning movement approaches either of the traction wheels the brake on that wheel is automatically applied, causing more of the power to be applied through the differential gearing to the opposite traction wheel which is turning on a longer radius.

A further object of the invention is to provide a steering mechanism employing a steering column of the conventional type connected by levers and links with the two swiveled wheels of the vehicle, the linkage being such that the wheel nearest the center of turning is swung faster than the other wheel, maintaining both wheels substantially at right angles to its radius of travel during turning movement, each of the wheels being movable through an angle of approximately 90° in one direction and through a smaller angle in the opposite direction.

With the above and other objects in view the invention may be said to comprise the steering mechanism as illustrated in the accompanying drawings and hereinafter described and particularly set forth in the appended claims, together with such variations and modifications thereof, as will be apparent to one skilled in the art to which the invention appertains. Reference should be had to the accompanying drawings forming a part of this specification, in which:

Figure 1 is a top plan view of a truck embodying the invention;

Fig. 2 is a side elevation of the truck;

Fig. 3 is a sectional view of the steering column and brake pedal taken on the line indicated at 3—3 of Fig. 2;

Fig. 4 is a diagrammatic plan view of the truck showing the steering wheels in the position which they occupy in making a right angle turn;

Fig. 5 is a plan view of the steering mechanism showing the normal or neutral position of the operating members in full lines, and the same members in one extreme position in dotted lines;

Fig. 6 is a section taken on the line indicated at 6—6 of Fig. 5;

Fig. 7 is a section taken on the line indicated at 7—7 in Fig. 1 showing one of the wheel brakes.

The truck of the present invention is provided with a conventional frame composed of channel side bars connected at intervals by cross bars, the frame being designated generally by the reference numeral 1. At its forward end the truck is provided with channel iron standards 2 rigidly attached to the frame to provide guides for a vertically movable lift platform 3 of the type commonly employed on industrial trucks. The frame 1 is supported at its forward end on a rigid axle 4 mounted in the lower ends of the standards 2 and traction wheels 5 are rotatably mounted upon opposite ends of the rigid axle. Each traction wheel 5 carries a brake drum 6 and a sprocket wheel 7. Chains 8 run over sprockets 7 and sprockets 9 which are fixed to axially aligned shaft 10 journalled in the frame 1. A differential gearing 11 is interposed between the inner ends of the aligned shafts 10 and is driven in the usual manner from an engine 12 mounted on the rear end of the frame 1. The rear end of the frame is supported upon swiveled steering wheels 13, each of which is journalled in a fork 14 provided with a vertical spindle 15 journalled in bearing brackets 16 on the opposite side members of the frame 1. The spindles 15 are preferably directly over the axles of the wheels 13.

Because of the fact that the weight of the load carried on the platform 3 and the weight of the truck is balanced upon the traction wheels 5, the traction wheels 5 may be required to carry an enormous load. For example, in a truck having a ten-ton load carrying capacity the weight of the truck would be about four tons and in order to prevent the load from overbalancing the truck it is necessary to attach to the rear end of the truck frame a counterbalance weight of approximately four tons. A major portion of this total weight of 18,000 pounds is imposed upon the traction wheels. It is, therefore, necessary that the axle upon which the traction wheels are supported possess great strength and rigidity. It is, therefore, not feasible to provide the usual tubular axle housing and differential gearing. Instead, the wheels are mounted upon the ends of a solid steel axle of comparatively large diameter and are driven through a differential gearing mounted independently of the wheels upon the truck frame.

An inwardly extending arm 17 is fixed to each of the spindles 15, the arms 17 being of equal length. Each arm 17 is connected by a link 18 to the free end of a longer lever arm 19 fixed to a vertical shaft journalled in a side member of the frame forwardly of the spindle. When the steering wheels 13 are in their straight-ahead position parallel with the frame 1, the spindle arms 17 extend inwardly at equal angles to the common axis of the steering wheels, being preferably inclined rearwardly at a small angle to said axis. The longer lever arms 19 attached to the shaft 20 are disposed nearly parallel to the arms 17 and the links 18 may be curved to clear the spindles 15 when in their rearmost positions.

Each spindle 15 is constrained to turn in the same direction as the shaft 20 to which it is connected through its arm 17, the link 18 and the lever arm 19 on the shaft. By reason of the greater length of the lever arms 19 the angular movement of each wheel spindle in either direction is ordinarily greater than the angular movement of the shaft 20 to which it is connected. Each shaft has an arm 21 fixed thereto which is disposed at substantially right angles to the arm 19. The arms 21 are of equal length and extend rearwardly from the shaft 20. When the steering wheels are in their straight-ahead position, the arms 21 diverge rearwardly, being then disposed at equal and opposite angles to the center line of the frame. The rear ends of the arms 21 are connected by a cross link 22. The connection between the shafts 20 provided by the diverging arms 21 and the connecting cross link 22 causes the two shafts 20 to turn in the same direction when angular movement is imparted to either shaft, with the shaft on the side toward which the cross link 22 is moving, turning at a higher angular speed and through a greater angle than the shaft on the opposite side of the frame. The maximum angular movement imparted to either spindle 15 by its link 18 moving in a rearward direction is approximately 90°, and the maximum angular movement imparted to either spindle by its link 18 moving forwardly is an angle less than 90° such that in either extreme position of the steering wheels one of the wheels is disposed at substantially right angles to the frame and the other at a lesser angle to the frame, the axes of the two steering wheels intersecting substantially at the center of the rear wheel at the side of the frame at which the steering wheel is disposed at right angles to the frame. By employing links and arms of the proper length and angularity, a differential angular movement of the steering wheels may be obtained, such that at all positions of adjustment thereof the axes of the steering wheels intersect at points lying substantially in the prolonged axis of the traction wheels. The steering wheels are shown in full lines in Fig. 4 of the drawings in one extreme position. As the steering wheels 13 are swung from the extreme position shown in full lines toward the normal position shown in dotted lines, the point of intersection of the axes of the two steering wheels will move outwardly away from the truck substantially along a line coincident with the axis of the traction wheels.

The proper relative speeds of angular movement of the two steering wheels to maintain the correct angularity in moving from the full line to the dotted line positions shown in Fig. 4 is dependent upon the ratio of the lateral distance between the steering wheel axes and the longitudinal distance between the traction wheel and steering wheel axes which determines the angle A C B in Fig. 4 of the drawings. It will be readily seen from an inspection of Fig. 4 that if the point of intersection C of the axes of the steering wheels 13 moves out along the extension of the axis of the traction wheels 5 as the wheels 13 are turned from their full line position toward the dotted line position, the relative angular movements of the wheels 13 will be such that there is a constant difference between the cotangents of the angles at which the two wheels are displaced from their normal positions shown in dotted lines in Fig. 4. The angle ACB will gradually decrease to zero as the wheels 13 move angularly from the full line position to the dotted line position. Also the angle ACB at the extreme position of lateral adjustment of the wheels becomes greater if the longitudinal distance between the traction and steering wheels is shortened, and becomes less if the longitudinal distance between wheels be made greater.

The steering linkage of the present invention provides a means for obtaining a very close approximation to the theoretically correct ratio of angular swinging movements of the steering wheels throughout a very wide range of angular movement and variations in the spacing of the shafts 20 with respect to each other and with respect to the spindles 15, and variations in the relative length and angularity of the arms 17, 19 and 21 will provide the correct motions for trucks having a wheel base longer or shorter than that shown herein.

The angularity of the arms 21 to the center line of the truck in the normal position of the steering mechanism determines the difference between the angular movements imparted to the two shafts 20. The variation between the angular movements is increased as the angularity of the arms 21 is increased. An increase in the distance between the shafts 20, or a shortening of the arms 21, also increases the difference in the angular movements but to a lesser degree. The diverging arms 21 and link 22 will not, however, impart to the shafts 20 relative angular movements corresponding to those desired for the steering wheel through a range of one hundred and eighty degrees less the angle ACB. Moreover, it would be difficult to impart such a great angular movement to the shafts 20 by means of the drag link 23.

By employing a second differential linkage between each of the shafts 20 and a spindle 15, however, the desired amount of angular movement may be imparted to the wheels 13 and the relative speeds of swinging movement of the wheels at the intermediate portions of their angular movement may be made to closely approximate the theoretically correct ratios.

The excess of angular movement of the spindles 15 over that of the shafts 20 is determined by the ratio of the length of each arm 19 to the arm 17 to which it is connected by the link 18 and by the length of the arms 17 and 19, or by the distance between the shafts. Lengthening the arms 17 and 19 while maintaining a fixed ratio between the lengths is equivalent to moving the shafts closer together, and shortening the arms is equivalent to moving the shafts further apart. An increase in the distance between the spindles 15 and shafts 20, or shortening the arms 19 and 17, increases the differential of angular movement in the direction of greater movement and decreases the differential in the direction of lesser movement.

A ratio between the lengths of the arms 17 and 19, and a distance between shaft centers which will give the desired amplitude of movement to the steering wheels, may be readily provided and corrections may be made for intermediate positions of the steering wheels by increasing or decreasing the distance between the spindles 15 and shafts 20, or by shortening or lengthening the arms 17 and 19. Adjustment of the arms 17 or 19 to a very small angle to the other arm may sometimes be desirable to obtain the correct relative angular movements.

The length angularity and spacing of the lever arms and links for a given truck may be determined by means of a simple system of levers and links corresponding to those to be employed on the truck. The correct angular positions of the steering wheels may be readily determined for a series of points intermediate the extreme positions. An angularity and length for the arms 21 may be selected which will give the desired amplitude of movement and the desired differential movement. Then by adjusting the arms corresponding to 17 and 19 and the points of connection of the link corresponding to 18 to the arms, the relative movements of the spindles corresponding to steering wheel spindles may be varied to cause the spindles to occupy the desired relative angular positions at the selected intermediate points.

It is desirable that the relative angularity of the steering wheels be correct at the limit of turning movement shown in Fig. 4, and that the correct relative angular movement be maintained accurately while the turning radius is short. This result can readily be obtained with the linkage of the present invention.

For imparting angular movement to the shaft 20 and steering wheel 13 a drag link 23 pivotally connected to the outer end of one of the arms 21 attached to the shaft 20 extends transversely across the frame and is pivotally connected at its opposite end to the free end of a vertically swinging lever 24 carried by horizontal shaft 25 connected by suitable gearing within a housing 26 to a steering column 27 mounted at one side of the frame 1. The drag link 23, lever 24, gearing and steering column are of conventional construction, corresponding to the steering column gearing and drag links commonly employed in motor vehicles. The steering column 27 is provided with the usual hand wheel 28. Brake and clutch pedals 29 and 30 are mounted on the opposite sides thereof as is common practice. The steering column is preferably arranged at one side of the frame so as to be operated by a driver on a seat which faces laterally so that the driver may steer the vehicle with equal facility in traveling forwardly or rearwardly.

Because of the heavy loads and severe impacts to which the steering wheels are likely to be subjected in service, it is desirable that the steering wheels be operated by levers turning on fixed pivots and connected by pivoted links. The use of gearing, cams or sliding pivots is objectionable because of the heavy thrust to which the actuating members may be subjected in service. The steering linkage of the present invention is rugged and inexpensive and affords a means of obtaining very close approximation to the theoretically correct ratio of angular movements of the steering wheels and, for these reasons, is preferable to a gearing or systems of levers including sliding links such as would be necessary to maintain the theoretical geometrical variation in the relative angularity of the steering wheels.

In motor vehicle steering mechanisms the maximum angular movement of the wheels is only about 45° as compared to the 90° movement provided in trucks of the present invention. An approximately correct ratio of angular movement for the 45° adjustment has been obtained by providing the wheel spindles with converging arms of equal length connected by a link. In the device of the present invention the shafts 20 have a differential connection provided by the link 22 attached to the diverging arms 21. The longer link connection between the diverging arms enables the shafts 20 to have a somewhat greater range of angular movement than when connected by a shorter link. In order to provide the proper relative movements through a wider range of adjustments a second differential linkage is provided between the shafts 20 and spindles 15. The movements of the shafts 20 imparted through the links 18 to the spindles 15 cause the spindles 15 to have approximately the correct differential movement through a large angle of adjustment.

When the truck is turning about a very short radius there is a tendency for the traction wheel turning about the shorter radius to slip by reason of the fact that the circumference of the circle about which this wheel is turning is very short as compared to the circumference of the circle about which the other traction wheel is turning. To overcome this difficulty, means is provided for applying the brake to the wheel which is turning upon the shorter radius as the center of turning approaches that wheel. As shown in Figs. 3, 5 and 6 the brake pedal 29 is mounted on the horizontal pivot 31 and connected by a transverse link 32 to an arm 33 of horizontally swinging bell crank lever pivoted to the frame which has an arm 34 connected to a longitudinally extending actuating rod 35 which is slidably mounted in a guide 36 carried by the frame and which has a T-shaped head 37 adapted when moved rearwardly to engage with lugs 38 carried upon the inner ends of sleeves 39 and 40 rotatably mounted upon a transverse shaft 41. Sleeves 39 and 40 have arms 42 and 43 at their outer ends to which are connected cables 44 and 45 which extend through tubes 46 and 47 to the brake drum 6. Cables 44 and 45 are each attached to a brake lever 48 within a brake drum. The two brakes are identical. Each lever 48 is attached to a shaft 49 which carries a cam 50 interposed between the ends of substantially semi-circular brake shoes 51 which are connected by a pivot 52 at a point diametrically opposite the shaft 49. The brake pedal 29 is normally held in an elevated position and the brake actuating head 37 in its forward position by means of a suitable spring 29a. When the brake pedal 29 is depressed the head 37 is moved rearwardly and by engagement with the lugs 38 both brakes are applied simultaneously as is desirable for retarding movement of the vehicle. Each of the sleeves 39 and 40 has an arm 53 attached thereto intermediate its ends. Each arm 53 is connected by a link 54 to an arm 55 of a bell crank lever positioned adjacent one of the shafts 20. Each bell crank lever has a second arm 56 at substantially right angles to the arm 55 and is pivoted on a vertical shaft 57 mounted in the frame alongside the shaft 20. Each of the arms 56 is connected by a chain 58 to one of the arms 21 fixed to the shafts 20. The shafts 57 are disposed inwardly of the arms 21 so that either arm 21, when moving outwardly away from the side of the frame 1 exerts a pull on the chain 58 connecting it to a brake as the arm 21 approaches its limit of outward movement. Since the arm 21 at the opposite side of the frame is moving inwardly the chain 58 on that side is slack and no pull is exerted on the bell cranklever at the side of the frame. As the arm 21 at one side of the frame moves outwardly toward its outermost position the steering wheel on that side of the frame moves to a position substantially at right angles to the traction wheel on that side and the turning radius, about which the traction wheel turns, approaches zero. The application of the brake to the wheel, as its radius in turning becomes short, causes most of the power to be applied through the differential to the traction wheel on the opposite side turning about a longer radius, and as a steering wheel approaches its right angle position the traction wheel on the same side will be locked against turning movement and the truck will be propelled in a circle having its center at the point of engagement of the traction wheel with the ground. By impeding the rotation of the wheel turning on a short radius the slippage of that wheel on the ground surface is greatly reduced and wear on the tires is reduced. Also, the driver is enabled to swing the vehicle in either direction about a fixed center on either rear wheel and to make right angle turns with great accuracy.

Furthermore, it is to be understood that the particular form of truck shown and described, and the particular procedure set forth, are presented for purposes of explanation and illustration and that various modifications of said truck and procedure can be made without departing from my invention as defined in the appended claims.

I claim:

1. A steering mechanism for a motor truck having a frame, a pair of laterally spaced traction wheels and a pair of laterally spaced swiveled steering wheels comprising a support for each steering wheel having a substantially vertical spindle above the wheel and journalled in the frame, each support being adapted to turn substantially 90° in one direction from the position in which its steering wheel is parallel with the traction wheels, an arm fixed to each of said spindles, a shaft on each side of the frame and spaced longitudinally from the spindle on that side of the frame, an arm fixed to each shaft, a link connecting the arms of the spindle and shaft at each side of the frame, arms of equal length fixed to said shafts, the latter arms being non-parallel and at equal and opposite angles to the longitudinal center line of the truck when the steering wheel are parallel to said center line, a link connecting the outer ends of said latter arms, and means for imparting a turning movement to said shafts in either direction to steer the truck.

2. A steering mechanism for a motor truck having a frame, a pair of laterally spaced traction wheels supporting one end of the frame and a pair of laterally spaced steering wheels supporting the opposite ends of the frame comprising a support for each steering wheel having a vertical spindle journalled in the frame, inwardly extending arms of equal length fixed one to each of said spindles, a pair of laterally spaced vertical shafts journalled in the frame, inwardly extending arms of equal length fixed one to each shaft, a link connecting the outer end of each of said arms with a spindle arm, a second arm attached to each shaft, said second arms being of equal length and opposite angularity, a link connecting said arms, and means for imparting angular movements in either direction to said shafts to steer the truck.

3. A steering mechanism for a motor truck having a frame, a pair of laterally spaced traction wheels supporting one end of the frame and a pair of laterally spaced steering wheels supporting the opposite ends of the frame comprising a support for each steering wheel having a vertical spindle journalled in the frame, inwardly extending arms of equal length fixed one to each of said spindles, a pair of laterally spaced vertical shafts journalled in the frame, inwardly extending arms of equal length fixed one to each shaft, a link connecting the outer end of each of said arms with a spindle arm, a second arm attached to each shaft, said second arms being of equal length and opposite angularity, a link connecting said arms, a lever pivoted to the frame at one side thereof, a link extending across the frame and connected at one end to said lever and at one end to an arm on one of said shafts, and means for actuating said lever in either direction to steer the truck.

ROY C. HOWELL.